United States Patent
Fazio

(10) Patent No.: US 12,298,787 B1
(45) Date of Patent: May 13, 2025

(54) DIRECTING MULTIPLE TARGETS WITHOUT INTERFERENCE

(71) Applicant: John Fazio, Portland, OR (US)

(72) Inventor: John Fazio, Portland, OR (US)

( * ) Notice: Subject to any disclaimer, the term of this patent is extended or adjusted under 35 U.S.C. 154(b) by 0 days.

(21) Appl. No.: 18/586,204

(22) Filed: Feb. 23, 2024

Related U.S. Application Data

(60) Provisional application No. 63/556,277, filed on Feb. 21, 2024, provisional application No. 63/486,732, filed on Feb. 24, 2023.

(51) Int. Cl.
| | | |
|---|---|---|
| *G05D 1/693* | (2024.01) | |
| *G05B 19/4155* | (2006.01) | |
| *G05D 1/225* | (2024.01) | |
| *G05D 107/70* | (2024.01) | |

(52) U.S. Cl.
CPC .......... *G05D 1/693* (2024.01); *G05B 19/4155* (2013.01); *G05D 1/225* (2024.01); *G05B 2219/34348* (2013.01); *G05D 2107/70* (2024.01)

(58) Field of Classification Search
CPC .......... G05D 1/693; G05D 1/646; G05D 1/02; G05D 1/225; G05D 2107/70; G05B 19/4155; G05B 2219/34348
See application file for complete search history.

(56) References Cited

U.S. PATENT DOCUMENTS

| | | | |
|---|---|---|---|
| 12,050,476 B2 * | 7/2024 | Kang | G01S 19/43 |
| 2020/0055515 A1 * | 2/2020 | Herman | G06V 20/58 |
| 2020/0192383 A1 * | 6/2020 | Nath | G05D 1/0278 |
| 2023/0074148 A1 * | 3/2023 | Di Cairano | G05D 1/104 |

FOREIGN PATENT DOCUMENTS

| | | | | | |
|---|---|---|---|---|---|
| EP | | 4361819 A1 * | 5/2024 | ........ | B60W 60/0011 |

OTHER PUBLICATIONS

Drone Advisory Committee (DAC) eBook, DAC Member (Public) Information for DAC Meeting, Feb. 27, 2020, Washington D.C., pp. 1-158.

* cited by examiner

*Primary Examiner* — Thomas E Worden
*Assistant Examiner* — Christopher A Buksa
(74) *Attorney, Agent, or Firm* — Chernoff, Vilhauer, McClung & Stenzel, LLP

(57) ABSTRACT

Universal Trajectory Calculators and Directors (UTCD) of the present disclosure may include a UTCD application running on a network that includes a desktop computer or mobile device and one or more servers. The UTCD application calculates trajectories and directs multiple targets or objects simultaneously along those calculated trajectories in two- or three-dimensional space without experiencing interference among the targets and/or with obstacles.

16 Claims, 8 Drawing Sheets

DIRECTING MULTIPLE TARGETS WITHOUT INTERFERENCE

CROSS-REFERENCE TO RELATED APPLICATIONS

This application claims the benefit of U.S. Provisional Patent Application No. 63/486,732 filed on Feb. 24, 2023 and entitled "Directing Multiple Targets Without Interference." Additionally, this application claims the benefit of U.S. Provisional Patent Application No. 63/556,277 filed on Feb. 21, 2024 and entitled "Optimizing an Unused Resource: Solution to Congestion Effects in Manufacturing, Warehousing, and Transportation." The complete disclosures of the above applications are hereby incorporated by reference for all purposes.

APPENDIX DATA

Computer Program Listing Appendix under 37 C.F.R. § 1.52(e).

This application includes a transmittal under 37 C.F.R. § 1.52(e) of a Computer Program Listing Appendix. The Appendix, which comprises text file(s) that are IBM-PC machine and Microsoft Windows Operating System compatible, includes the below-listed file. All of the material disclosed in the Computer Program Listing Appendix can be found at the U.S. Patent and Trademark Office archives and the complete disclosure is hereby incorporated by reference for all purposes.

Object Description: calc2r3polcombzintpenf13picsv4eq4actzadjax11I3g18f2.txt, size: 235,589 Bytes, created: Feb. 20, 2024.

FIELD

This disclosure relates to directing multiple targets or objects without interference. More specifically, the disclosed embodiments relate to systems and methods for calculating non-interfering trajectories and directing targets along those trajectories.

INTRODUCTION

The need for increased efficiency in use of space and resources is evident in manufacturing with the rising demand of consumers for low cost products customized to their individual tastes and delivered in a timely manner. Attempting to meet the demand often results in congestion on the factory or warehouse floor in the era of fast-paced production. The cost of interference in moving this increasing volume of product out of the factory, warehouse, or distribution center drives businesses to maximize use of space in moving and stocking products. One business concern for the case of customized products is the ability to rapidly move product from the floor to a final location while avoiding or minimizing collisions.

With the advent of drones, the space above the factory floor now becomes potentially available to businesses that produce and distribute products. Maximizing the use of space can delay the need for a business to purchase or build another factory or warehouse. However, the drones may collide with each other and/or with other objects if not directed properly leading to product and/or equipment loss, damage to facilities, etc.

There is a need for directing multiple targets or objects simultaneously in two- or three-dimensional space without experiencing interference among the objects and/or with obstacles.

DETAILED DESCRIPTION

Figure 1:
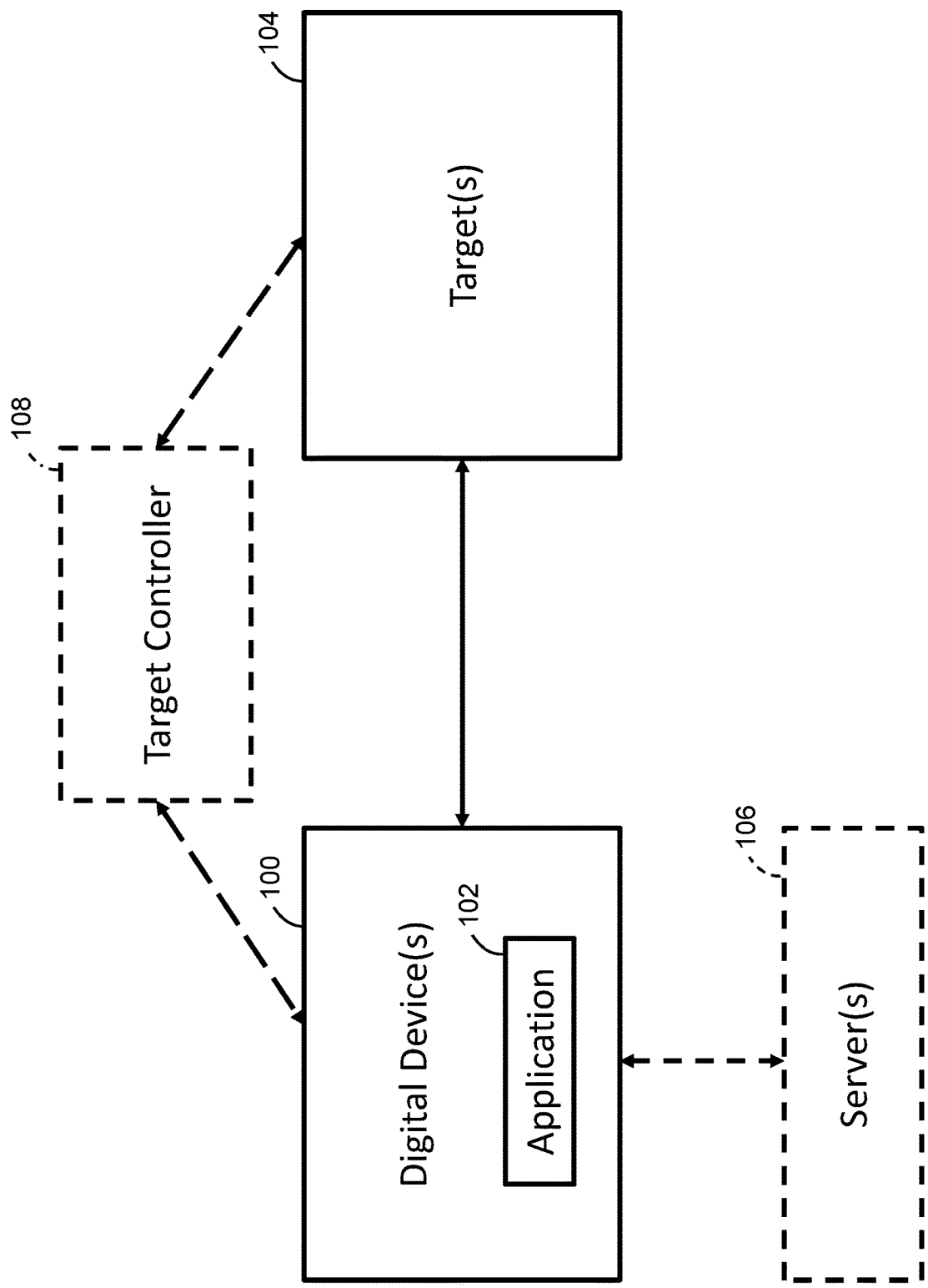
FIG. 1 is a schematic diagram showing an example of physical components of a universal trajectory calculator and director (UTCD).

Various aspects and examples of a universal trajectory calculator and director (UTCD), as well as related methods, are described below and illustrated in the associated drawings. Unless otherwise specified, a UTCD of the present teachings, and/or its various components may contain at least one of the structures, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components, and is not necessarily limited to physical connection(s).

"Obstacle" means any object (e.g., vehicles, aircraft, watercraft, tables, chairs, lamps), structure (e.g., buildings, street signs, light posts, shelving systems, equipment), or the like that is within a path of a target moving from its departure point to its destination point and that a target must avoid, increase speed, decrease, speed, and/or move or steer around to minimize or avoid collisions with the obstacle. An obstacle may include other targets whether those targets are stationary or moving.

"Target" means any object capable of moving via a motor, engine, propulsion mechanism, or the like from departure coordinates to destination coordinates, such as vehicles (e.g., cars, trucks, vans, motorcycles, buses), aircraft (e.g., drones, airplanes), watercraft (e.g., boats, barges, submarines), spacecraft, rockets, trains, etc. The object may, for example, be supporting, carrying, and/or containing load, such as one or more packages.

Overview

In general, a universal trajectory calculator and director (UTCD) of the present disclosure may include a network connected UTCD application running on a stationary or mobile digital device, such as a desktop computer or a smart phone. More specifically, the UTCD application (also referred to as an app) includes functionality that calculates trajectories for the targets between departure and destination coordinates and directs those targets along those trajectories from the departure coordinates to the destination coordinates.

Aspects of the UTCD described herein may be embodied as a computer method, computer system, or computer program product. Accordingly, aspects of the UTCD may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the UTCD may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including wireless, wireline, optical fiber cable, RF, and/or the like, and/or any suitable combination of these.

Computer program code for carrying out operations for aspects of the UTCD may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the UTCD are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the UTCD. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative UTCDs, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative UTCD

This section describes an example of a universal trajectory calculator and director (UTCD). The UTCD includes a network connected UTCD application ("app") 102 running on one or more stationary and/or mobile digital device(s) 100, such as desktop computer(s), smart phone(s), and/or tablet(s), to control and/or direct one or more targets 104. As shown in FIG. 1, the digital device may communicate with one or more servers 106 and/or may communicate with a separate and distinct target controller 108. Each of the digital device(s), server(s), target controller(s), and targets may include one or more processors, one or more receivers, one or more transmitters, one or more storage devices, etc. In some examples, the digital device(s), target controller(s), and/or targets may include one or more sensors that collect various information, such as environmental information (e.g., ground elevation height), obstacle information, etc. In other examples, digital device(s), target controller(s), and/or targets may be free from or exclude any sensors.

B. Illustrative UTCD Method

This section describes steps of an illustrative method performed by the UTCD. Aspects of the UTCD may be utilized in the method steps described below. Where appropriate, reference may be made to components and systems that may be used in carrying out each step. These references are for illustration, and are not intended to limit the possible ways of carrying out any particular step of the method.

Figure 2:
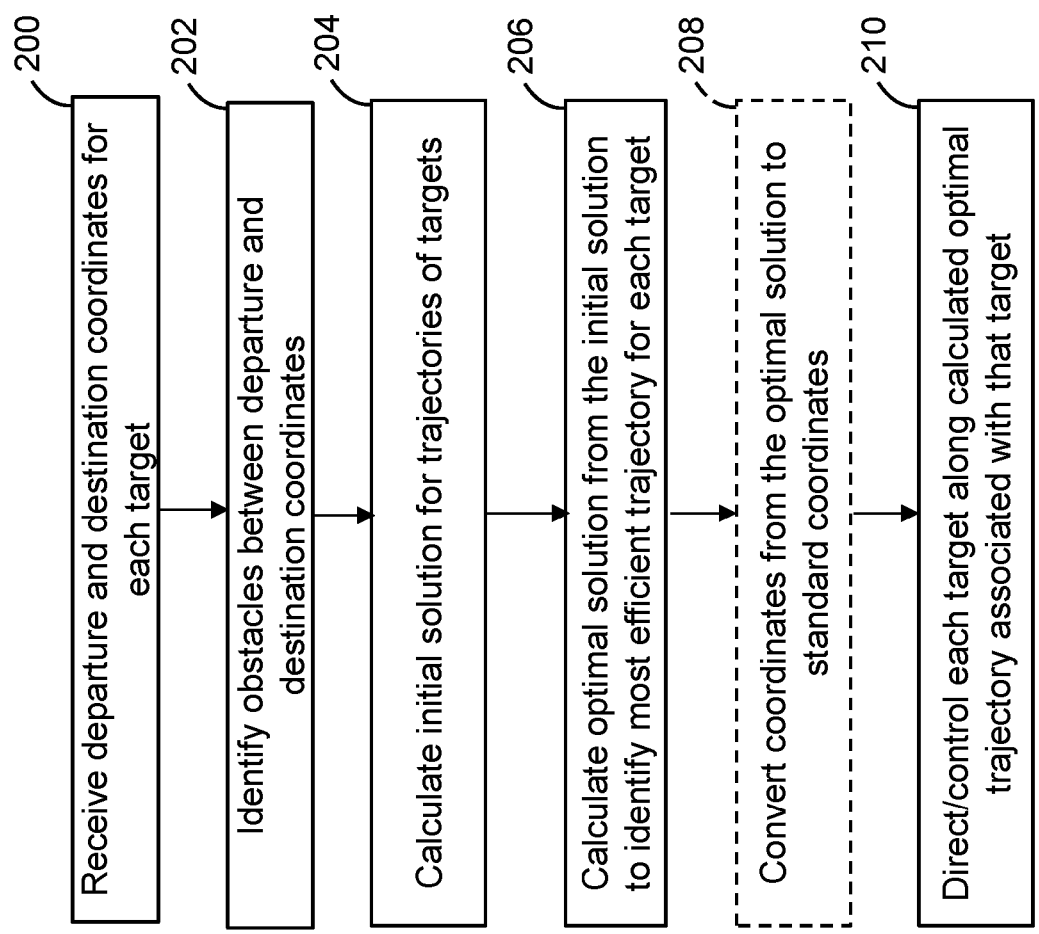
FIG. 2 is a flowchart depicting steps of an example of a method performed by the UTCD.

FIG. 2 is a flowchart illustrating steps performed in an illustrative method, and may not recite the complete process or all steps of the method. Although various steps of that method are described below and depicted in FIG. 2, the steps need not necessarily all be performed, and in some cases may be performed simultaneously or in a different order than the order shown.

Initially, the UTCD application receives departure and destination coordinates for each target from one or more users at 200. For example, an interface may be presented to the user(s) to enter the coordinates. In some examples, the interface may be a map and the user(s) may simply tap on the portions of the map to indicate the departure and destination coordinates. Additionally, or alternatively, the user(s) may enter the departure and destination coordinates via keyboard, mouse, and/or voice command. In some examples, the UTCD application may receive ground elevation information and/or shape of the desired area or volume and/or its Geographic Coordinate System (GCS) coordinates in which the initial and optimal trajectories will be determined. In other words, the desired area or volume determines the boundaries of the initial and optimal trajectories and the entirety of the initial and optimal trajectories will be contained within the desired area or volume. For example, when the selected volume is cuboid, the GCS coordinates for the eight corners of the desired cuboid may be received. The UTCD application fits a polynomial equation to the ground elevation for further use as discussed below.

The UTCD application identifies obstacles (e.g., buildings, natural terrain, power plants, pipelines, and transmission lines, shelves, and other internal/external structures) between the departure and destination coordinates at 202. The UTCD application may obtain the information from various Digital Elevation Models (DEMs), various databases, such as Google® maps or the Energy Information Administration Energy Mapping System from the American Geosciences Institute. Additionally, sensor data may be received from the targets and/or the UTCD application may prompt the user to enter known coordinates of obstacles, dimensions of obstacles, etc. In some examples, the UTCD application may not perform the above step, such as when there are no obstacles between the departure and destination coordinates or when the trajectories are calculated to a minimum height to avoid obstacles, such as buildings, transmission lines, etc.

The UTCD application expresses the trajectory of a target from departure point to destination point with coordinates expressed as a polynomial. For example, the polynomial "y" describing the trajectory in the horizontal plane for the movement of package "k" is:

$$y_k = A_{0,k} + A_{1,k} X_k^1 + A_{2,k} X_k^2 + \ldots + A_{ns,k} X_k^{ns} \qquad \text{(Equation 4)}$$

Additionally, the polynomial "z" describing the trajectory in the vertical plane for the movement of package "k" is:

$$z_k = B_{0,k} + B_{1,k} X_k^1 + B_{2,k} X_k^2 + \ldots + B_{n,k} X_k^n \qquad \text{(Equation 9)}$$

The UTCD application can perform the calculations for trajectories in two dimensions when the target moves only in two dimensions (e.g., boat or other watercraft that moves on the surface of a water body) or the user wants the target to move in only two dimensions. Alternatively, the UTCD application can perform the calculations for trajectories in three dimensions.

The UTCD application calculates an initial solution for trajectories (or initial trajectory) of targets at 204. For example, the UTCD application (1) expresses the trajectory of each target by a polynomial, (2) expresses the polynomials in matrix format, and (3) operates on the matrices to generate the initial solution, as further described below.

Figure 3:
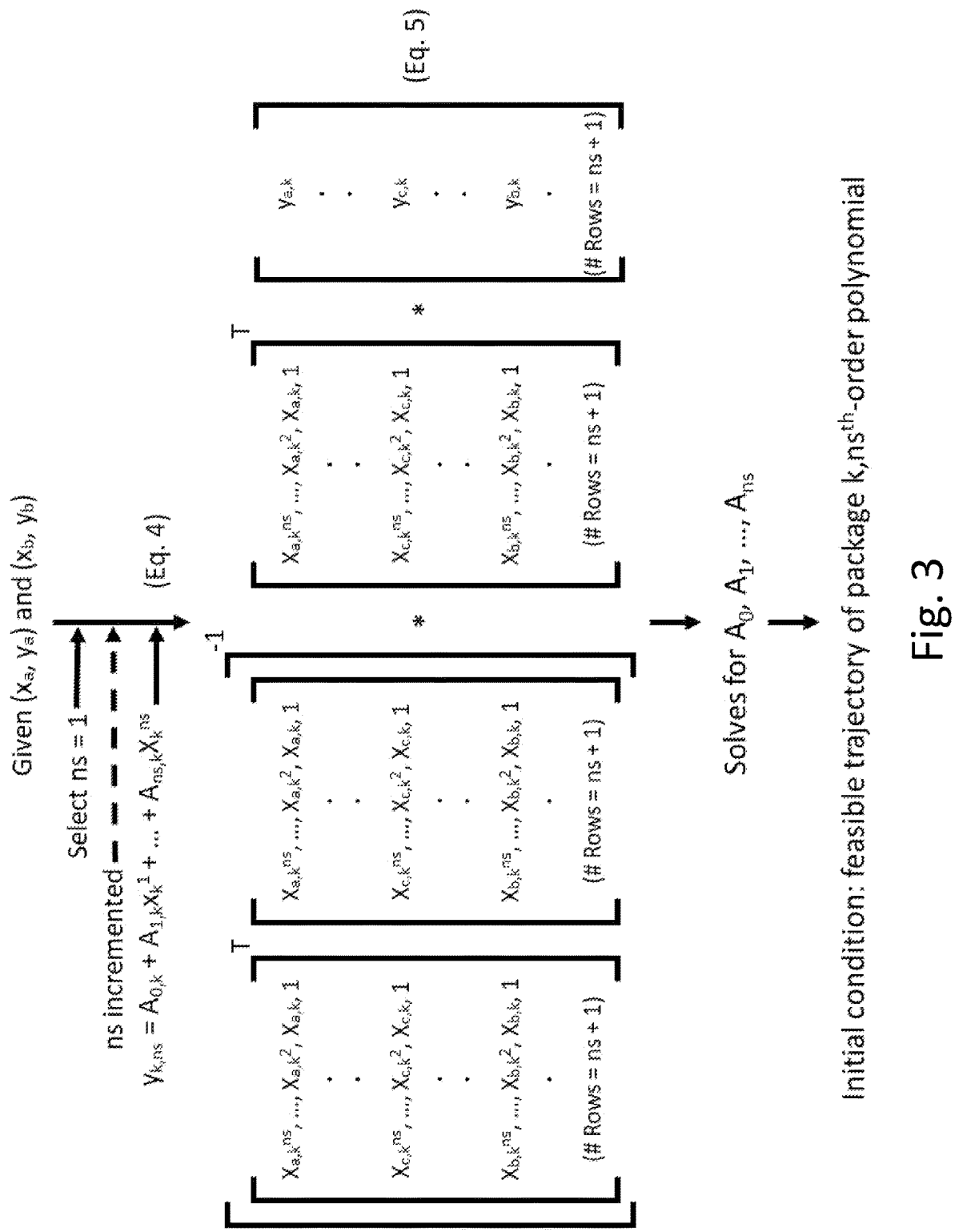
FIG. 3 is a flowchart depicting steps of an example of a method of calculating an initial solution for trajectories of targets in two dimensions.

The UTCD application solves the number of terms of the polynomial and solves the coefficients of the polynomial terms. The UTCD application formats the terms of the polynomial in a matrix format and then solves for the parameters (e.g., $A_{0,k}, A_{1,k}, A_{2,k} \ldots A_{ns,k}$). For example, for trajectories in two dimensions, the UTCD application calculates the initial values via least square estimate through a matrix operation in which the solution for parameter A is expressed in general form as:

$$A = (X'X)^{-1} \cdot (X'Y) \qquad \text{(Equation 5)}$$

Where "X'" is the transpose of the matrix "X". The parameter "A" in Equation 4 above is solved via Equation 5 above. The procedure for initial calculation of parameters is shown in FIG. 3. The notations "$x_{c,k}$" and "$y_{c,k}$" refer to evenly spaced distances between departure and destination points for "$x_k$" and "$y_k$" coordinates, respectively. For example, the value of "$x_c$" is as follows:

$$x_c = [(\text{row number}-1)(x_b - x_a)/(ns+1)-1)] + x_a$$

Where "c"=row number and similarly for "$y_c$". Simultaneous solution for the set of ns+1 parameters requires ns+1 constraints. Completion of the steps shown in FIG. 3 provides an initial solution for parameter "A". The parameter "A" represents the set ($A_0, A_1, A_2, \ldots, A_{ns}$) that are the coefficients of the ns-order polynomial that describe a path of a target in terms of coordinates on the X,Y surface.

Figure 4:
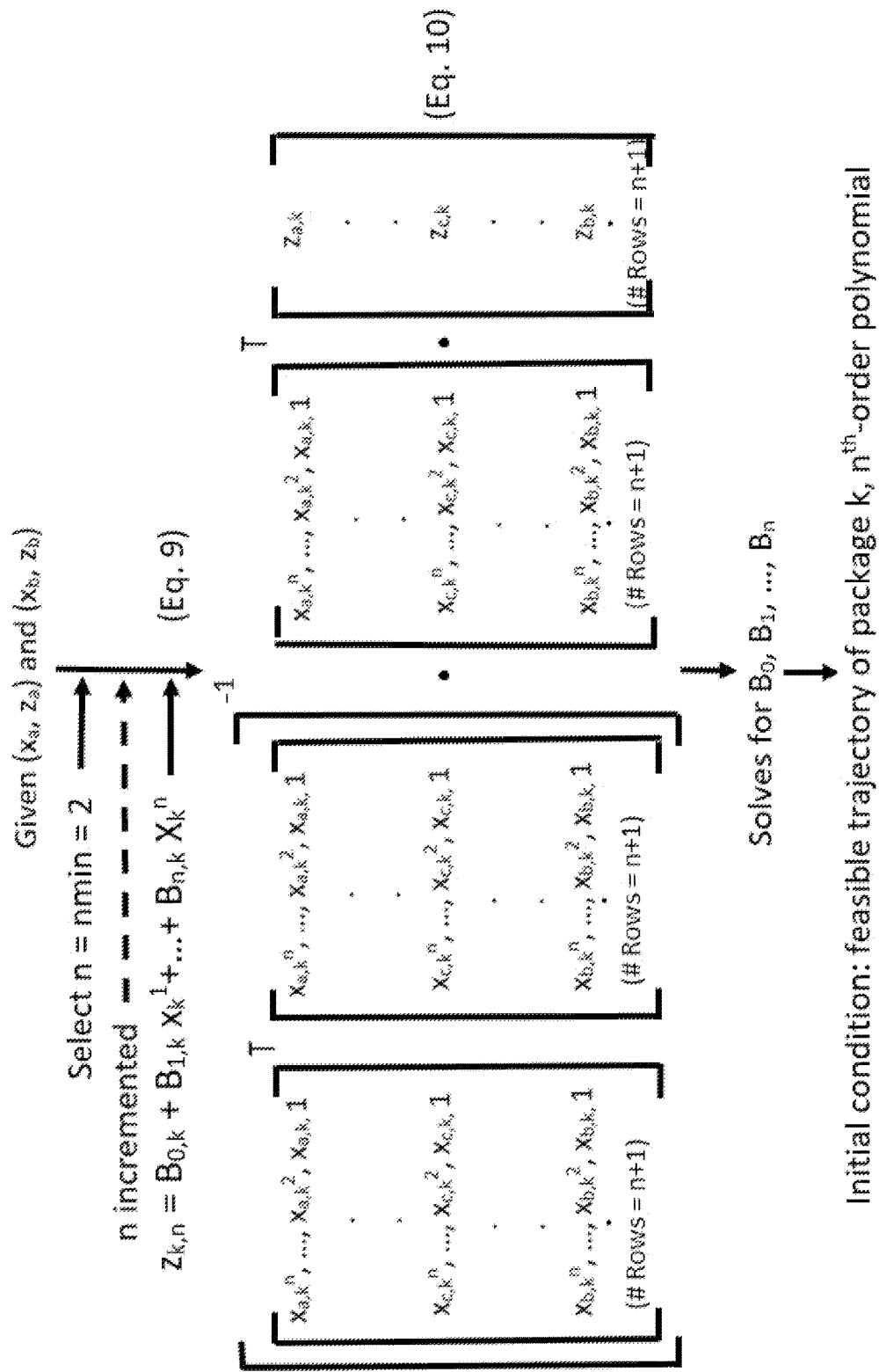
FIG. 4 is a flowchart depicting steps of an example of a method of calculating an initial solution for trajectories of targets in three dimensions.

For trajectories in three dimensions, the UTCD application performs similar calculations as shown above and also performs calculations for parameter "B" as the basis for calculating a trajectory in X,Y,Z space. The UTCD application calculates the initial values via least square estimate through a matrix operation in which the solution for parameter "B" is expressed in general form as:

$$B = (X'X)^{-1} \cdot (X'Z) \tag{Equation 10}$$

Where "X'" is the transpose of the matrix "X". The parameter "B" in Equation 9 above is solved via Equation 10 above. The procedure for initial calculation of parameters is shown in FIG. 4. The notations "$x_{c,k}$" and "$y_{c,k}$" refer to evenly spaced distances between departure and destination points for "$x_k$" and "$y_k$" coordinates, respectively. The subscript "c" is the matrix row number. Rows in the matrix become more numerous with each increment of "n". For example, the value of "$x_c$" is as follows:

$$x_c = [(\text{row number}-1) \cdot (x_b - x_a)/(ns+1)-1)] + x_a$$

The value of "$z_c$" is as follows:

$$Zc = \text{Max}\{1.0 - \text{abs}[(\text{row number}-(n+2)/2)/(((n+2)/2)-1)] \cdot ((zmx - xmn) + zmn), xmsfty\}$$

Where:
zmnsfty=a minimum elevation to be specified between the departure and destination points for the consideration of safety and to accommodate governing regulations.

$Z_c$=0 at the departure and the destination points.
Simultaneous solution for the set of n+1 parameters requires n+1 constraints. Completion of the steps shown in FIG. 4 provides an initial solution for parameter "B". The parameter "B" represents the set ($B_0, B_1, B_2, \ldots, B_{ns}$) that are the coefficients of the ns-order polynomial that describe a path of a target in terms of coordinates on the X,Y surface.

The UTCD application calculates an optimal solution at 206 to identify the most efficient trajectory (or optimal trajectory) for each target. For example, the UTCD application (a) inputs the initial solution into an objective function along with a set of constraints to be met, (b) numerically satisfies all constraints, and (c) performs an optimization search procedure to find an optimal solution that identifies the most efficient trajectory for each target, as further discussed below. The optimal solution satisfies an objective function, such as minimum path length, while also satisfying a set of constraints, which can be equality and/or inequality constraints and/or linear and/or nonlinear constraints. Constraints can specify such features as limiting elevations, tolerances for clearance of a target relative to any other target, no collisions with other targets and obstacles, etc. The path length is calculated as an integral over the trajectory from the start of a trajectory to its destination. The integral solution is closely approximated by Simpson's Rule.

The UTCD application develops required derivatives via an objective function. For example, the elevation of package "k" at any point along its trajectory is expressed as:

$$Z_{x,y,k} = B_{0,k} x_k^1 + B_{2,k} x_k^2 + \ldots + B_{n,k} x_k^n \tag{Equation 11}$$

Where "$Z_{x,y,k}$" is the elevation of a target at any location above the horizontal (X,Y) plane at a specified ($x_k, y_k$) coordinate. "Z" is a function of "x" as shown above. The dependence of "Z" on "y" at every "x" is shown with the following polynomial:

$$y_k = A_{0,k} + A_{1,k} x_k^1 + A_{2,k} x_k^2 + \ldots + A_{ns,k} x_k^{ns}$$

The UTCD application applies an objective function to determine the optimum trajectory, or path of least length in three dimensions, for each target from its departure to its destination. The objective function used can be linear, quadratic, or any other nonlinear function. "Optimum trajectory" as used herein refers to a trajectory of minimum length of all feasible trajectories. The UTCD application minimizes the objective function "F", which is the integral over "x" of the length of the trajectory in (X,Y,Z) space of each target.

$$F = \text{Min} \int [1 + (dy/dx \cdot dy/dx) + (dz/dx \cdot dz/dx)]^{1/2} dx \tag{Equation 14}$$

Where "y" is the variable for calculating along the trajectory in the horizontal plane (see Equation 4) and "z" is the variable for calculating elevation along the trajectory (see Equation 9). The UTCD application evaluates "dy/dz" as follows:

$$dy/dx = A_1 + A_2 \cdot 2 \cdot x_k^1 + \ldots + A_{ns} \cdot ns \leq x_k^{ns-1} \tag{Equation 15}$$

Where "y" is expressed in polynomial form (see Equation 4). Additionally, "$y_a$" and "$y_b$" are in polynomial form as follows:

$$y_a = A_0 + A_1 x_a + A_2 x_a^2 + \ldots + A_{ns} x_a^{ns}$$

$$y_b = A_0 + A_1 x_b + A_2 x_b^2 + \ldots + A_{ns} x_b^{ns}$$

The UTCD application calculates "$A_0, A_1 \ldots A_{ns}$" as shown in FIG. 3 and described above. The UTCD application evaluates "dz/dx" as follows:

$$dz/dx = B_1 + B_2 \cdot 2 \cdot x_k^1 + \ldots + B_0 \cdot n \cdot x_k^{n-1} \tag{Equation 18}$$

Where "z" is expressed in polynomial form (see Equation 9). Additionally, "$z_a$" and "$z_b$" are in polynomial form as follows:

$$Z_a = B_0 + B_1 x_a + B_2 x_a^2 + \ldots + B_n x_a^n$$

$$Z_b = B_0 + B_1 x_b + B_2 x_b^2 + \ldots + B_n x_b^n$$

The UTCD application calculates "$B_0, B_1 \ldots B_n$" as shown in FIG. 4 and described above.

The UTCD application approximates the integral in Equation 4 via Simpson's rule, which provides the approximate value of the integral as well as an upper bound on the error of that value. For example, the UTCD application approximates the integral as follows:

$$F(x) = \Sigma_i^{nai} w_i \cdot f(a + (i \cdot h)) \tag{Equation 21}$$

Where:
i=number of subintervals into which integration interval is divided
nai=maximum number of trapezoids (even number) to approximate area under a curve
$w_i$=weighting factor for trapezoidal approximation.

Where $w_i=1$ if $i=0$ or $i=n$; and
$w_i=4$, if $i=2m-1$, with $m=1, 2 \ldots n/2$ with n even; and
$w_i=2$, if $i=2m$, with $m=1, 2 \ldots n/2$ with n even.
Where a and b are lower and upper limits of the function, respectively, and $h=(b-a)/2n$. The error estimate of the above formula is as follows:

$$|E_s| \leq (b-a)/180 \cdot (h4) \cdot M$$

Where M is the upper bound of $f^{(4)}$ over the interval [a,b]. To ensure that the error $|E_s|$ is less than a preset tolerance limit "T", the UTCD application calculates and sets the following:

$$nai \geq [((b-a)/180)((b-a)^4)M/T]^{(1/4)}$$

For example, the UTCD application sets the variable "a" in Equation 21 to the departure point x-coordinate and the approximated value for the integral to be minimized is:

$$F(x) = \Sigma_i^{nai} w_i f_i(x_a + (i \cdot h)) \quad \text{(Equation 23)}$$

Where $f_i = f_i(x_a + (i \cdot h)) = [1 + (dz_i/dx_i \cdot dz_i/dx_i) + (dy_i/dx_i \cdot dy_i/dx_i)]^{1/2}$.

Examples of how the UTCD application determines the error estimate in Simpson's rule and derives the term "nai" are further discussed in the section entitled "Minimizing Objective Function" in U.S. Provisional Patent Application No. 63/556,277. The constraints applied by the UTCD application to the integral to be minimized are discussed in detail in the section entitled "Constraint Descriptions" in U.S. Provisional Patent Application No. 63/556,277. Although particular constraints are shown, other examples of the UTCD application may include other constraints in addition to, or instead of, the constraints discussed in the section entitled "Constraint Descriptions" in U.S. Provisional Patent Application No. 63/556,277. How the UTCD application rephrases each constraint in the section entitled "Constraint Descriptions" as a mathematical penalty function is described in the section entitled "Penalty Functions and Their Derivatives" in U.S. Provisional Patent Application No. 62/556,277. Violation of any constraint will cause the value of "F'" to be so large that the UTCD application will eliminate the trajectory in searching for a minimum path length. For example, if the "no collision" constraint is violated, a penalty is assigned such that the particular trajectory that violates the "no collision" constraint is not selected for the optimal trajectory. The UTCD application searches for a minimum value in the iterative solution of this modified function "F'" to determine the pathway for each target with the smallest length among the paths that satisfy all of the defined constraints.

The UTCD application minimizes the modified objective function "F'" to find the shortest pathway from the departure to the destination points that does not result in interference with mapped objects or obstacles or with other targets in transit (e.g., does not violate constraints). In one example, the method incorporates a revised version of the Newton-Raphson method to incrementally improve the estimate of the optimal trajectory for an identified target. More details are provided in U.S. Provisional Patent Application No. 63/556,277.

The UTCD application runs an optimization algorithm that determines the optimal solution for parameters ($A_2 \ldots A_{ns}$) and for ($B_2 \ldots B_n$) with "$A_0$" and "$A_1$" expressed as functions of "$A_2$" through "$A_{ns}$" and with "$B_0$" and "$B_1$" expressed as functions of "$B_2$" through "$B_n$". Evaluating "$A_0$" and "$A_1$" and "$B_0$" and "$B_1$" in this way ensures that the first two constraints for each of the two polynomial sets "y" and "z" are satisfied while allowing the optimization algorithm to set the remaining parameters ($A_2 \ldots A_{ns}$) for the y-polynomial and ($B_2 \ldots B_n$) for the z-polynomial to their optimal values.

The optimization algorithm adjusts stepwise the parameters ($A_2 \ldots A_{ns}$) (and resulting $A_0$ and $A_1$) for the y-polynomial and the parameters ($B_2 \ldots B_n$) (and resulting $B_0$ and $B_1$) for the z-polynomial using a search technique to converge within an accuracy criterion on an exact solution of a modified objective function "F'" that is given in terms of the parameters. The set of parameters and functions thereby determined describes a trajectory. The search technique employs a Newton-Raphson procedure to incrementally search for an optimal solution to the modified objective function. The calculation and search procedure include testing for violation of penalty functions. The UTCD application terminates the optimization algorithm upon obtaining the optimum trajectory.

Figure 5:
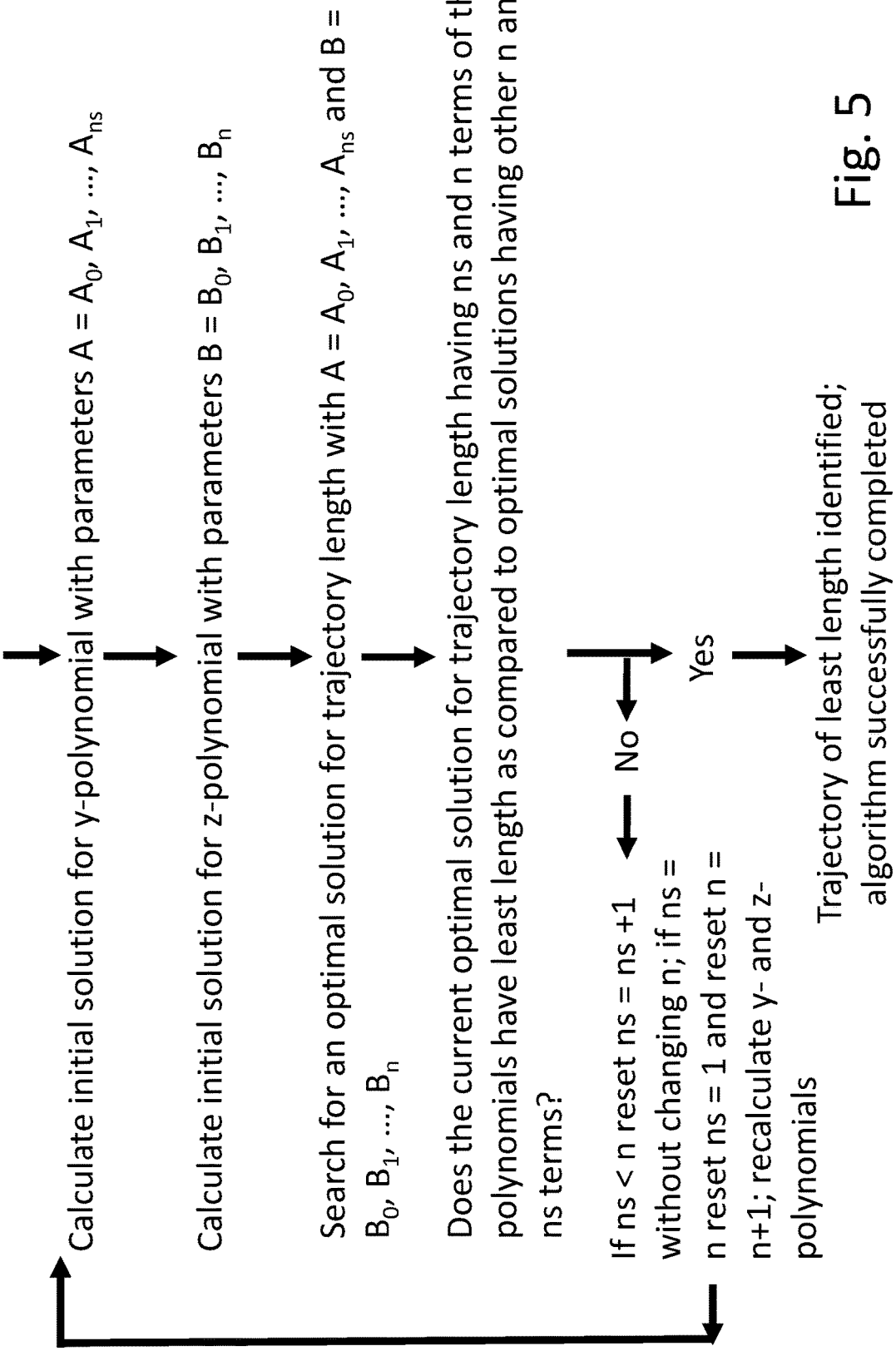
FIG. 5 is a flowchart depicting steps of an example of a method of calculating an optimal solution for trajectories of targets.

An example of the optimization algorithm used by the UTCD application is shown in FIG. 5. Calculation of the initial solution for the y-polynomial is as discussed above and shown in FIG. 3. Calculation of the initial solution for the z-polynomial is as discussed above and shown in FIG. 4. An example of stepwise calculations for optimization of trajectory length are shown below.

```
C       Initialize variables nmin = 2, noptcycles = 0, ε = 1., XINCR=1, NBSCS=0, JINCRMIN=0
C       A0p(i)=A0(i), IARAVGED=0, XCAVEP=1, XCAVP(JINCR,1)=1, DELTk=0, AOAVE=0
        Define arrays A(i, JINCR-1), F(JINCR), F'(JINCR-1), F'BASE(JINCRMIN), Δ(i), FpPrimeA(i, JINCR-1),
&       FpDPrimeA(i, JINCR-1), NNTFEAS, IFIN, DELTFMIN, DELTFMINPREV, FMINPREV, NTRIALS
        n = nmin
        OptDone=False
     [  Do 200 While Not OptDone
     |      noptcycles = noptcycles + 1
     |    [  IF noptcycles > 250 Then
     |    |     Write 'The optimum number of terms of this polynomial did not converge to an optimum'
     |    |     Stop
     |    [  ENDIF
C    |  Matrix solutions of A₀, ... , A_ns and ns (see Diagram 1), and of B₀, ... , Bn and n (see Diagram 2)
     |    [  Do 10 i = 0, ns
     |    |     Write [A₀, . . . , A_ns] to array A(i, 0)
     |    [  10 Continue
     |    [  Do 11 i = 0, n
     |    |     Write [B₀, . . . , B_n] to array B(i, 0)
     |    [  11 Continue
     |           Solve y, z, f, f⁽⁴⁾, nai, F, penalty functions, F'(0)
     |    [  Do 20 i = 2, ns
     |    |     Solve FpPrimeA(i,0), FpDPrimeA(i,0), Δ(i) and write to arrays
     |    [  20 Continue
```

```
            |   [   Do 21 i = 2, n
            |   |   Solve FpPrimeB(i,0), FpDPrimeB(i,0), Δ(i) and write to arrays
            |   ⌊   21 Continue
            |       F'BASE(0) = F'(0)
            |       ifin = 0
            |       ntrials = 3
            |       nntfeas = 0
            |       nbscs = 0
            |   ⌈   Do 100 JTRIAL = 0, ntrials
            |   |         ⌈       IF ifin = 1 THEN
            |   |         |              XINCR = 1.0/12.0
            |   |         ⊢       ELSE
            |   |         |              XINCR = 1.0
            |   |         ⌊       END IF
            |   |         ⌈       Do 50 JINCR = 1, 2$^{(ns+nk)}$
            |   |         |           ⌈   Do 40 i = 2, ns and i = 2, n
C           |   |         |           |   This block of code builds one array A containing both A and B coefficients
            |   |         |           |            ⌈   IF FpDPrimeA(i, 0) > 0 Then
            |   |         |           |            |        Δ(i) = FpPrimeA(i, 0) / FpDPrimeA(i, 0) / XINCR
            |   |         |           |            ⊢   ELSEIF FpPrimeA(i, 0) > .0001 .and. FpDPrimeA(1,0) ≤ 0 Then
            |   |         |           |            |        Δ(i) = F(0) / FpPrimeA(i, 0) / XINCR
            |   |         |           |            ⊢   ELSE
            |   |         |           |            |        Δ(i) = . 0001
            |   |         |           |            ⌊   END IF
            |   |         |           |                DELTk = DELTk + v(i)
            |   |         |           |                A0AVE = A0AVE + A0(i)
            |   |         |           |                imod = JINCR mod 2
            |   |         |           |                IF imod = 0 Then imod = 2
            |   |         |           |            ⌈   IF ISODD(MOD(imod) Then
            |   |         |           |            |        XSTA = 1
            |   |         |           |            ⊢   ELSE
            |   |         |           |            |        XSTA = -1
            |   |         |           |            ⌊   END IF
            |   |         |           |                Write XSTA * Δ(i) to array Δ(i)
            |   |         |           ⌊   40 Continue
C           |   |         |               Compute average Δ(i) over all ns and n parameters
C           |   |         |               Llim and Ulim are the lower and upper bounds for specifying the set of parameters
C           |   |         |               whose values are being optimized in the following algorithm.
            |   |         |               DELTk = DELTk / (Ulim - Llim +1)
C           |   |         |               Compute average Δ(i) over all ns and n parameters
            |   |         |               A0AVE = A0AVE / (Ulim Llim + 1)
C           |   |         |               Two parameter loops are in the code; one when iopt = 1 and Ulim = ns for A parameters
C           |   |         |               The second loop is when iopt = 2 and Ulim = n for B parameters
            |   |         |           ⌈   IF iopt = 2 Then
            |   |         |           |        XKAVEP = ((DELTk * XSTA * . 05 * ((.5)$^{(XTRIAL-1)}$ )) + A0AVE)/A0AVE
            |   |         |           |        XCAVEP = XCAVEP * XKAVEP
            |   |         |           |        XCAVEP(JINCR, JTRIAL) = XCAVEP
            |   |         |           |    ⌈   IF JTRIAL > 1 Then
            |   |         |           |    |      ⌈    IF XCAVEP < 1 Then
            |   |         |           |    |      |         XKAVEP = 1 / (XCAVEP(JINCR, JTRIAL-1))
            |   |         |           |    |      |         XCAVEP = 1
            |   |         |           |    |      |         XCAVEP(JINCR, JTRIAL) = 1.0
            |   |         |           |    |      ⌊    END IF
            |   |         |           |    ⌊   ENDIF
            |   |         |           ⌊   ENDIF
C           |   |         |               This portion of the code limits the multiple average change in the parameters
C           |   |         |               for the optimization search to at most a multiple of 4 and a reduction multiple of .25
C           |   |         |               The average over all the parameters is used due to the safety comfort
C           |   |         |               minimum elevation constraint which means that the optimal sollution is likely to be flat.
            |   |         |           ⌈   IF JTRIAL = 1 AND JINCR = 1 Then
            |   |         |           |      ⌈    FOR i = Llim to Ulim
            |   |         |           |      |         ⌈   IF ABS(XCAVEP) < 4 Then
            |   |         |           |      |         |       AP(i) = 4 * AERR(i)
            |   |         |           |      |         ⊢   ELSEIF ABS(XCAVEP) < .025 Then
            |   |         |           |      |         |       AP(i) = .25* AERR(i)
            |   |         |           |      |         ⊢   ELSE
            |   |         |           |      |         |       AP(i) = ABS(XCAVEP) * AERR(i)
            |   |         |           |      |         ⌊   ENDIF
            |   |         |           |      ⌊    NEXT i
            |   |         |           ⌊   ENDIF
            |   |         |               Z1SV = 0
C           |   |         |               This potion of the code calculates for this optimization search trial and scenario the elevation
C           |   |         |               to be tried. It then compares this elevation to the elevation constraint for safety comfort.
C           |   |         |               The optimal solutin without considering other constraints is at teh elevation for safety comfort.
C           |   |         |               This portion of the code tries different elevations to be set for the search between the
C           |   |         |               original trial elevation and the safety comfort elevation constraint to find such elevation
C           |   |         |               at which an optimal solution is found considering all constraints.
            |   |         |               iX = 1
            |   |         |               XiX = iX
            |   |         |               Xk = nk
```

```
                    XIX = Xjjmn + (Xix * (Xjjmx − Xjjmn) / Xk
                    FOR kk = Llim to Ulim
                            Xk = kk − ns − 2
                            Z1SV = Z1sv + (AP(kk) * (XIX) ^{Xk} )
                    NEXT kk
                    RATZ1 = ((Z1SV + ZMINSFTYCMFRT) / 2)/ Z1SV
                    FOR I = Llim to Ulim
                            IF Z1SV > ZMNSFTYCMFRT Then
                                    AP(i) = RATZ1 * AP(i)
                            ELSEIF Z1SV < Z1SFTYCMFRT Then
                                    AP(i) = AP(i) * ZMINSFTYCMFRT / Z1SV
                            ENDIF
                    NEXTi
                    FOR I = Llim to Ulim
                            IF iopt = 1 Then
                                    AP(L) = AARR(L)+(XSTA*Δ(i) )
                            ENDIF
                                    A(i, JINCR) = AP(i)
                            IF A(I, JINCR) = 0 Then
                                    A(I, JINR) = sig
                                    AARR(i) = A(i, JINCR)
                            ENDIF
                    NEXTi
C               Solve A_0, A_1, y, z,f^{(4)}, nai, F, penalty functions, F'(JINCR), FpPrimeA(i,JINCR),
                    FpDPrimeA(i,JINCR)
C               FpPrimeB(i,JINCR), FpDPrimeB(i,JINCR)
                Write F'(JINCR), FpPrimeA(i,JINCR), FpDPrimeA(i, JINCR), FpPrimeB(i,JINCR),
                FpDPrimeB(i, JINCR) to arrays
                    If JINCR = 1 Then
                            F'MIN = F'(JINCR)
                    ELSE
                            IF F'(JINCR) ≤ F'MIN Then
                                    F'MIN = F'(JINCR)
                            ENDIF
                    ENDIF
                50 Continue
                IF JTRIAL > 1 Then
                    FOR L = 1 to (ns+nk+2)
                                    IF iCODMIN = 1 Then
                                        AARR(L) = (A0(L) + A0PV(L)) / 2
                                    ELSE
                                        AARR(L) = (AMIN(L) + AMINPV(L)) / 2
                                    ENDIF
                    NEXT L
                ENDIF
                Do 30 i = 1, ns
                    A_0p(i) = A(i, 0)
                30 Continue
                Do 31 i = 1, n
                    B_0p(i) = B(i, 0)
                31 Continue
                IF F'BASE(0) ≤ F'MIN Then
                    NBSCS = NBSCS + 1
                    IF NBSCS ≥ 2 Then
                            XINCR = XINCR * 2
                    END IF
                    JINCRMIN = 0
                ELSE
                    Do 35 i = 1, ns
                            A(i, 0) = A(i, JINCRMIN)
                            FpPrimeA(i, 0) = FpPrimeA(i, JINCRMIN)
                            FpDdPimeA(i, 0) = FpDPrimeA(i,JINCRMIN)
                    35 Continue
                    Do 36 i = 1, n
                            B(i, 0) = B(i, JINCRMIN)
                            FpPrimeB(i, 0) = FpPrimeB(i, JINCRMIN)
                            FpDdPimeB(i, 0) = FpDPrim'eB (i,JINCRMIN)
                    36 Continue
                END IF
C           First alternate test for finding optimal solutions of F'
                OPTSOL = TRUE
                Do 60 i = 2, ns
                    IF FpPrimeA(i, 0) = 0 .and. FpDPrimeA(i, 0) > 0 Then
                                    OPTSOL = TRUE
                                    Go to 60
                    ELSE
                                    OPTSOL = FALSE
                                    Go to 65
                    ENDIF
```

```
                      60 Continue
                      Do 61 i = 2, n
                         [   IF FpPrimeB(i, 0) = 0 .and. FpDPrimeB(i, 0) > 0 Then
                         |                   OPTSOL = TRUE
                         |                   Go to 61
                         ├   ELSE
                         |                   OPTSOL = FALSE
                         |                   Go to 65
                         [   ENDIF
                      61 Continue
                         [   IF OPTSOL = TRUE Then
                         |                   Go to 110
                         ├   ELSE
                         |                   Go to 101
                         [   ENDIF
C                     Second Alternate test for finding optimal solution of F'
                      65 Do 70 i = 2, ns
                         [   If A(i,0) = Aop(i) Then
                         |                   OPTSOL = TRUE
                         |                   Go to 70
                         ├   ELSE
                         |                   OPTSOL = FALSE
                         |                   Go to 75
                         [   ENDIF
                      70 Continue
                      Do 71 i = 2, n
                         [   If B(i,0) = Bop(i) Then
                         |                   OPTSOL = TRUE
                         |                   Go to 71
                         ├   ELSE
                         |                   OPTSOL = FALSE
                         |                   Go to 75
                         [   ENDIF
                      71 Continue
                      IF OPTSOL = TRUE Then
                                          Go to 110
                      ELSE
                                          Go to 101
                      ENDIF
C                     Set the data for the base case for the next jtrial
                      75 IF F'BASE(0) > F'MIN Then
                              F'BASE(0) = F'MIN
                          [   Do 80 i = 1, n+1
                          |               A(i, 0) = A(i, JINCRMIN)
                          [   80 Continue
                              JINCRMIN = 0
                      ENDIF
                      IF JTRIAL = NTRIALS .AND. NBSCS = 0 THEN
                              DELTFMIN = FMIN - FMINPREV
C                             Continue with another trial by incrementing JTRIAL if value of objective function
C                             for this cycle is lower than that for the previous trial
                          [   IF FMIN < FMINPREV - 1.0 THEN
                          |           [   IF ifin = 1 .or. ABS(deltfmin) > 1.0 THEN
                          |           |         ifin = 1
                          |           |     [   IF ABS(deltfmin) < FMIN/12.0 THEN
C                         |           |     |   Adjust the scale factor to set the increment of the objective function trial by trial
C                         |           |     |   to an increment which attempts to search for the optimum in fewer steps
                          |           |     |   XINCR = 1.0/(fmin/12.0)/ABS(deltfmin) * XINCR
                          |           |     ├   ELSE
                          |           |     |       XINCR = 1.0
                          |           |     [   ENDIF
                          |           ├   ELSE
                          |           |       ifin = 0
                          |           |       NTRIALS = NTRIALS + 1
                          |           [   ENDIF
                          [   ENDIF
                      ENDIF
                      iCOUNTLIMMAXPV = Icountlimmax
                      JTRIAL = JTRIAL + 1
                      deltfminprev = deltfmin
                      fminprev = fmin
                      fsumminprev = fsummin
C                     This portion of the code detects if this trial has passed beyond the x coordinate
C                     at which the minimum of the function F occurs.
C                     Beyond this point the optimization search algorithm looks at x coordinates
C                     between this point and previous points tried to zero in on the x coordinate
C                     at which the minimum of x occurs.
                      [   IF fmin ≥ fminprev-1 Then
                      |       [   IF IARAVGED = 0 Then
```

-continued

```
                                    [ FOR L = 1 to (ns+nk+2)
                                    |     A0PV(L) = A0(L)
                                    |     AMINPV(L) = AMIN(L)
                                    [ NEXT L
                                    IARAVGED = 1
                            [ ENDIF
                       ENDIF
                  [ IF IARAVGED = 1 Then
                       [ IF ABS(fmin - fminpv ≤ 1 Then
                             [ FOR L = 1 to (ns+nk+2)
                             |     A0PV(L) = A0(L)
                             |     AMINPV(L) = AMIN(L)
                             [ NEXT L
                         ⊢ ELSE
                             ifin=0
                         [ ENDIF
                         [ IF JTRIAL > NTRIAL Then
                         |     NTRIAL = NTRIAL + 1
                         [ ENDIF
                       [ ENDIF
             [ 100 Continue
             IF OPTSOL Then Go To 110
             101 Write 'Algorithm Ends Without Finding An Optimal Solution, jtrial =', JTRIAL
             Go to 120
             110 Write 'Optimal Solution Search Algorithm Ends Successfully, jtrial =', JTRIAL
             120 Continue
             F'MINSAV(ns,n) = F'BASE(0)
             F'MINSAVm(n) = Min(F'MINSAV(ns,n), F'MINSAVm(n))
             IF F'MINSAV(ns,n) = F'MINSAVm(n) THEN nsminsav(n) = ns
             OptDone = False
C            Incrementing polynomials having ns and n number of terms
             [ IF n ≤ nmax Then
                  [ IF n > nmin Then
                       [ IF ns < n THEN
                              ns = ns + 1
                              OptDone = False
                         ⊢ ELSEIF ABS(F'MINSAVm(n) - F'MINSAV(n-1) < sig Then
                              n = n-1
                              ns = nsminsav(n)
                              OptDone = True
                              Write 'The optimum number of terms of this polynomial =', n
                         ⊢ ELSE
                              n = n+1
                              ns = 1
                              OptDone = False
                       [ End If
                  ⊢ ELSE
                       n = n+1
                       ns = 1
                       OptDone=False
                  [ ENDIF
             ⊢ ELSE
                  n = n-1
                  ns = nsminsav(n)
                  OptDone = True
                  Write 'The optimum number of terms of this polynomial =', n
             [ ENDIF
        [ 200 Continue
          Stop
          End
```

Figure 6:
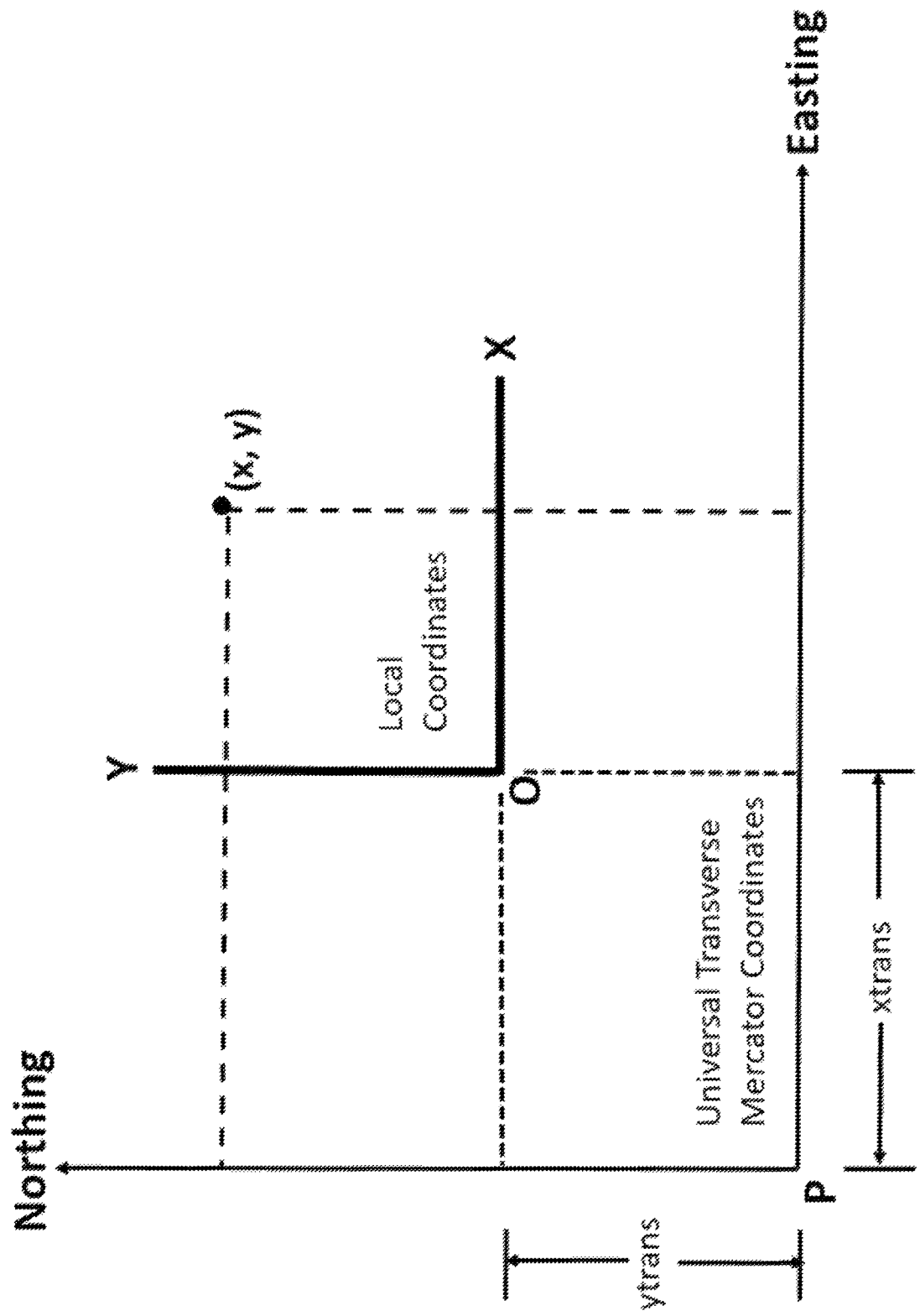
FIG. 6 is a schematic diagram of an example of a method of transforming local x- and y-coordinates of a target trajectory to Universal Transverse Mercator (UTM) Eastings and Northings.

In some embodiments, the UTCD application converts the results of step 206 into standard and/or universal coordinates that may be used for directing and/or controlling each package at 208. For example, the UTCD application may convert local (x,y) coordinates to Universal Transverse Mercator (UTM) coordinates as shown in FIG. 6 and described in equation form as shown below.

Easting=$x$+xtrans　　　　(Equation 37a)

Northing=$y$+ytrans　　　　(Equation 37b)

Where:
xtrans=horizontal distance in the easterly direction from the origin of the UTM coordinates to the origin of the local coordinates ytrans=horizontal distance in the northerly direction from the origin of the UTM coordinates to the origin of the local coordinates.

The above translation amounts "xtrans" and "ytrans" are inputted by the user via, for example, a user interface. In some embodiments, the UTCD application may rotate as well as translate the coordinates when converting the coordinates, such as when one coordinate system is angled relative to another. When the local system is rotated at an angle "θ" with respect to the system into which it is transformed, UTCD application converts the coordinates to UTM coordinates via transformation equations shown below.

Easting=$[x+\text{xtrans}+y\cdot\tan(\theta)]/[\cos(\theta)+\sin(\theta)\cdot\tan(\theta)]$ Northing=$[y+\text{ytrans}-x\cdot\tan(\theta)]/[\cos(\theta)+\sin(\theta)\cdot\tan(\theta)]$ Additionally, the UTCD application may convert local "z" coordinates to an absolute elevation via the equation shown below.

$$Z = Z1 + Z2 + tolz$$

Where:
"Z1" is the z(x, y, k) referenced to the local plane as shown above.
"Z2" is the ground elevation referenced to a standard vertical datum, such as the North American Vertical Datum of 1988 (NAVD88).
"tolz" is an error tolerance in the vertical dimension (see the section entitled "Constraint Descriptions" and Exhibit 1 of in U.S. Provisional Patent Application Ser. No. 63/486,732).

The UTCD application may then direct and/or control each target along the calculated optimal trajectory associated with that target at 210. The UTCD application may continuously direct and/or control each target along the trajectory. Alternatively, the UTCD application may transmit the trajectories to the targets prior to the targets moving and the targets may follow the transmitted trajectories when those targets are instructed to move (or scheduled to move) from the departure point to the destination point. The transmitted trajectories may be the complete trajectory from the departure point to the destination point, or may be a partial trajectory from one point to another point along the path from the departure point to the destination point. In some examples, the calculated optimal trajectories of each target may be checked to ensure that none of the trajectories will collide with each other prior to directing and/or controlling each target along its calculated optimal trajectory.

Although particular steps are discussed above, the method may alternatively, or additionally, include one or more additional steps, such as building a graph or map using information on departure coordinates, destination coordinates, obstacle coordinates, and/or optimal trajectories for the targets, and performing spline curve based path optimization, Other examples of the method may exclude some or all of the above additional steps.

C. Illustrative Data Processing System

Figure 7:
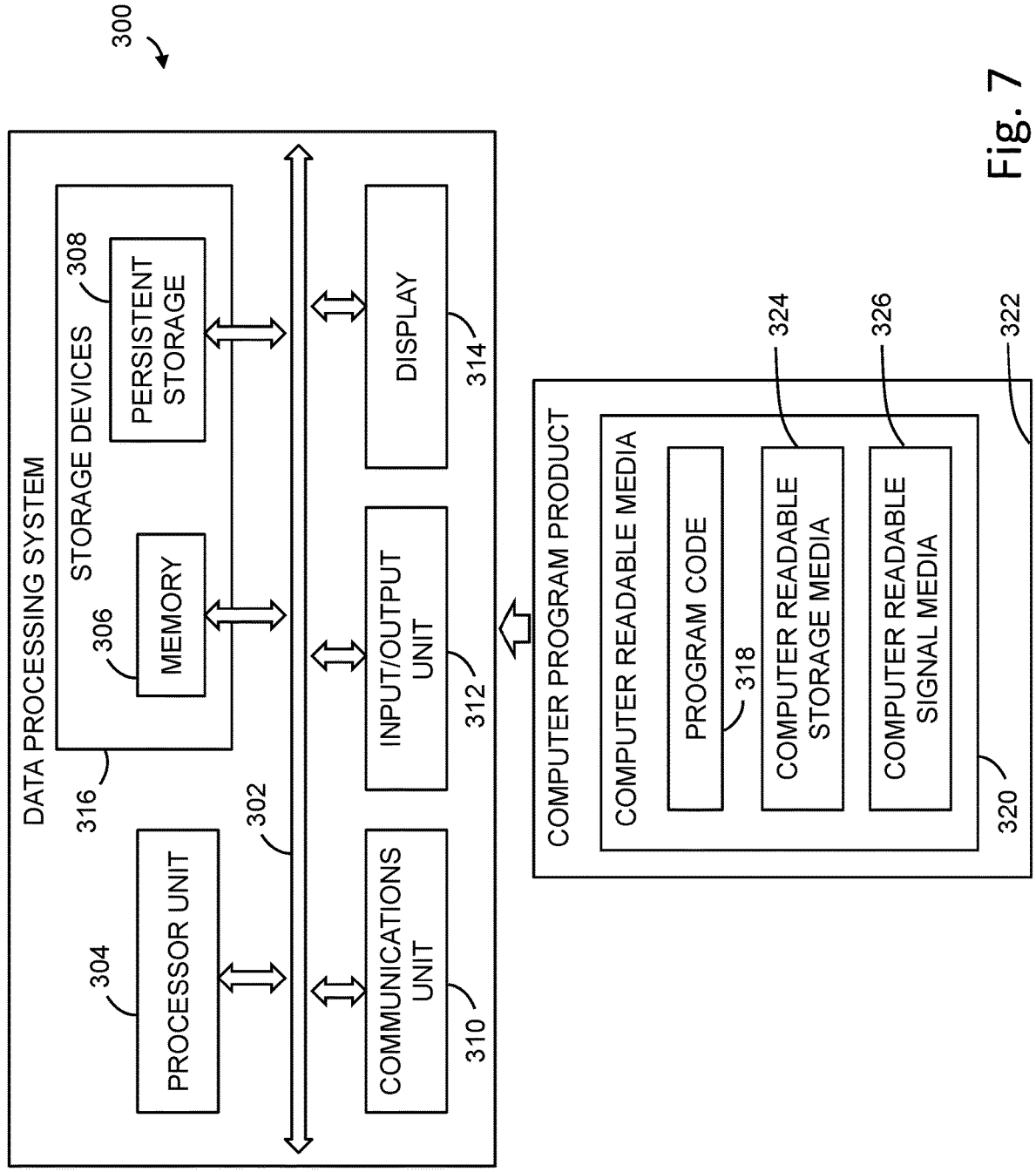
FIG. 7 is a schematic diagram of various components of an illustrative data processing system suitable for use with aspects of the present disclosure.

As shown in FIG. 7, this example describes a data processing system 300 (also referred to as a computer, computing system, and/or computer system) in accordance with aspects of the present disclosure. In this example, data processing system 300 is an illustrative data processing system suitable for implementing aspects of the UTCD. More specifically, in some examples, devices that are embodiments of data processing systems (e.g., smartphones, tablets, personal computers) that may be used. Further, devices that are embodiments of data processing systems (e.g., smartphones, tablets, personal computers) may be used as one or more server(s) in communication with one or more mobile communication devices.

In this illustrative example, data processing system 300 includes a system bus 302 (also referred to as communications framework). System bus 302 may provide communications between a processor unit 304 (also referred to as a processor or processors), a memory 306, a persistent storage 308, a communications unit 310, an input/output (I/O) unit 312, a codec, and/or a display 314. Memory 306, persistent storage 308, communications unit 310, input/output (I/O) unit 312, display 314, and codec are examples of resources that may be accessible by processor unit 304 via system bus 302.

Processor unit 304 serves to run instructions that may be loaded into memory 306. Processor unit 304 may comprise a number of processors, a multi-processor core, and/or a particular type of processor or processors (e.g., a central processing unit (CPU), graphics processing unit (GPU), etc.), depending on the particular implementation. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device may include any suitable hardware capable of storing information (e.g., digital information), such as data, program code in functional form, and/or other suitable information, either on a temporary basis or a permanent basis.

Storage devices 316 also may be referred to as computer-readable storage devices or computer-readable media. Memory 306 may include volatile storage memory 340 and non-volatile memory. In some examples, a basic input/output system (BIOS), containing the basic routines to transfer information between elements within the data processing system 300, such as during start-up, may be stored in non-volatile memory. Persistent storage 308 may take various forms, depending on the particular implementation.

Persistent storage 308 may contain one or more components or devices. For example, persistent storage 308 may include one or more devices such as a magnetic disk drive (also referred to as a hard disk drive or HDD), solid state disk (SSD), floppy disk drive, tape drive, Jaz drive, Zip drive, LS-80 drive, flash memory card, memory stick, and/or the like, or any combination of these. One or more of these devices may be removable and/or portable, e.g., a removable hard drive. Persistent storage 308 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 308 to system bus 302, a removable or non-removable interface is typically used, such as interface 328.

Input/output (1/O) unit 312 allows for input and output of data with other devices that may be connected to data processing system 300 (i.e., input devices and output devices). For example, input device 332 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 304 through system bus 302 via interface port(s). Interface port(s) may include, for example, a serial port, a parallel port, a game port, and/or a universal serial bus (USB).

Output devices 334 may use some of the same types of ports, and in some cases the same actual ports, as input device(s) 332. For example, a USB port may be used to provide input to data processing system 300 and to output information from data processing system 300 to an output device 334. Output adapter 338 is provided to illustrate that there are some output devices 334 (e.g., monitors, speakers, and printers, among others) which require special adapters. Output adapters 338 may include, e.g. video and sounds cards that provide a means of connection between the output device 334 and system bus 302. Other devices and/or systems of devices may provide both input and output capabilities, such as remote computer(s). Display 314 may include any suitable human-machine interface or other mechanism configured to display information to a user, e.g., a CRT, LED, or LCD monitor or screen, etc.

Communications unit 310 refers to any suitable hardware and/or software employed to provide for communications with other data processing systems or devices. While communication unit 310 is shown inside data processing system 300, it may in some examples be at least partially external to data processing system 300. Communications unit 310 may include internal and external technologies, e.g., modems (including regular telephone grade modems, cable modems, and DSL modems), ISDN adapters, and/or wired and wireless Ethernet cards, hubs, routers, etc. Data processing system 300 may operate in a networked environment, using logical connections to one or more remote computers. Remote computer(s) may include a personal computer (PC), a server, a router, a network PC, a workstation, a microprocessor-based appliance, a peer device, a smart phone, a tablet, another network note, and/or the like. Remote computer(s) typically include many of the elements described relative to data processing system 300. Remote computer(s) may be logically connected to data processing system 300 through a network interface which is connected to data processing system 300 via communications unit 310. Network interface encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec may include an encoder, a decoder, or both, comprising hardware, software, or a combination of hardware and software. Codec may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec can be a separate component, codec may be contained or implemented in memory, e.g., non-volatile memory.

Non-volatile memory may include read only memory (ROM), programmable ROM (PROM), electrically programmable ROM (EPROM), electrically erasable programmable ROM (EEPROM), flash memory, and/or the like, or any combination of these. Volatile memory may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 316, which are in communication with processor unit 304 through system bus 302. In these illustrative examples, the instructions are in a functional form in persistent storage 308. These instructions may be loaded into memory 306 for execution by processor unit 304. Processes of one or more embodiments of the present disclosure may be performed by processor unit 304 using computer-implemented instructions, which may be located in a memory, such as memory 306.

These instructions are referred to as program instructions, program code, computer usable program code, or computer-readable program code executed by a processor in processor unit 304. The program code in the different embodiments may be embodied on different physical or computer-readable storage media, such as memory 306 or persistent storage 308. Program code 318 may be located in a functional form on computer-readable media 320 that is selectively removable and may be loaded onto or transferred to data processing system 300 for execution by processor unit 304. Program code 318 and computer-readable media 320 form computer program product 322 in these examples. In one example, computer-readable media 320 may comprise computer-readable storage media 324 or computer-readable signal media 326.

Computer-readable storage media 324 may include, for example, an optical or magnetic disk that is inserted or placed into a drive or other device that is part of persistent storage 308 for transfer onto a storage device, such as a hard drive, that is part of persistent storage 308. Computer-readable storage media 324 also may take the form of a persistent storage, such as a hard drive, a thumb drive, or a flash memory, that is connected to data processing system 300. In some instances, computer-readable storage media 324 may not be removable from data processing system 300.

In these examples, computer-readable storage media 324 is a non-transitory, physical or tangible storage device used to store program code 318 rather than a medium that propagates or transmits program code 318. Computer-readable storage media 324 is also referred to as a computer-readable tangible storage device or a computer-readable physical storage device. In other words, computer-readable storage media 324 is media that can be touched by a person.

Alternatively, program code 318 may be transferred to data processing system 300, e.g., remotely over a network, using computer-readable signal media 326. Computer-readable signal media 326 may be, for example, a propagated data signal containing program code 318. For example, computer-readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer-readable signal media 326 for use within data processing system 300. For instance, program code stored in a computer-readable storage medium in a server data processing system may be downloaded over a network from the server to data processing system 300. The computer providing program code 318 may be a server computer, a client computer, or some other device capable of storing and transmitting program code 318.

In some examples, program code 318 may comprise an operating system (OS). Operating system, which may be stored on persistent storage 308, controls and allocates resources of data processing system 300. One or more applications take advantage of the operating system's management of resources via program modules, and program data stored on storage devices 316. The OS may include any suitable software system configured to manage and expose hardware resources of computer 300 for sharing and use by the applications. In some examples, the OS provides application programming interfaces (APIs) that facilitate connection of different type of hardware and/or provide the applications access to hardware and OS services. In some examples, the certain applications may provide further services for use by other applications, e.g., as is the case with so-called "middleware." Aspects of present disclosure may be implemented with respect to various operating systems or combinations of operating systems.

The different components illustrated for data processing system 300 are not meant to provide architectural limitations to the manner in which different embodiments may be implemented. One or more embodiments of the present disclosure may be implemented in a data processing system that includes fewer components or includes components in addition to and/or in place of those illustrated for computer 300. Other components shown in FIG. 7 can be varied from the examples depicted. Different embodiments may be implemented using any hardware device or system capable of running program code. As one example, data processing system 300 may include organic components integrated with inorganic components and/or may be comprised entirely of organic components (excluding a human being). For example, a storage device may be comprised of an organic semiconductor.

In some examples, processor unit 304 may take the form of a hardware unit having hardware circuits that are specifically manufactured or configured for a particular use, or to produce a particular outcome or progress. This type of hardware may perform operations without needing program code 318 to be loaded into a memory from a storage device to be configured to perform the operations. For example, processor unit 304 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 318) may be implemented as hardware, e.g., by specifying an FPGA configuration using a hardware description language (HDL) and then using a resulting binary file to (re)configure the FPGA.

In another example, data processing system 300 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

In another example, system bus 302 may comprise one or more buses, such as a system bus or an input/output bus. Of course, the bus system may be implemented using any suitable type of architecture that provides for a transfer of data between different components or devices attached to the bus system. System bus 302 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 310 may include a number of devices that transmit data, receive data, or both transmit and receive data. Communications unit 310 may be, for example, a modem or a network adapter, two network adapters, or some combination thereof. Further, a memory may be, for example, memory 306, or a cache, such as that found in an interface and memory controller hub that may be present in system bus 302.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

D. Illustrative Distributed Data Processing System

Figure 8:
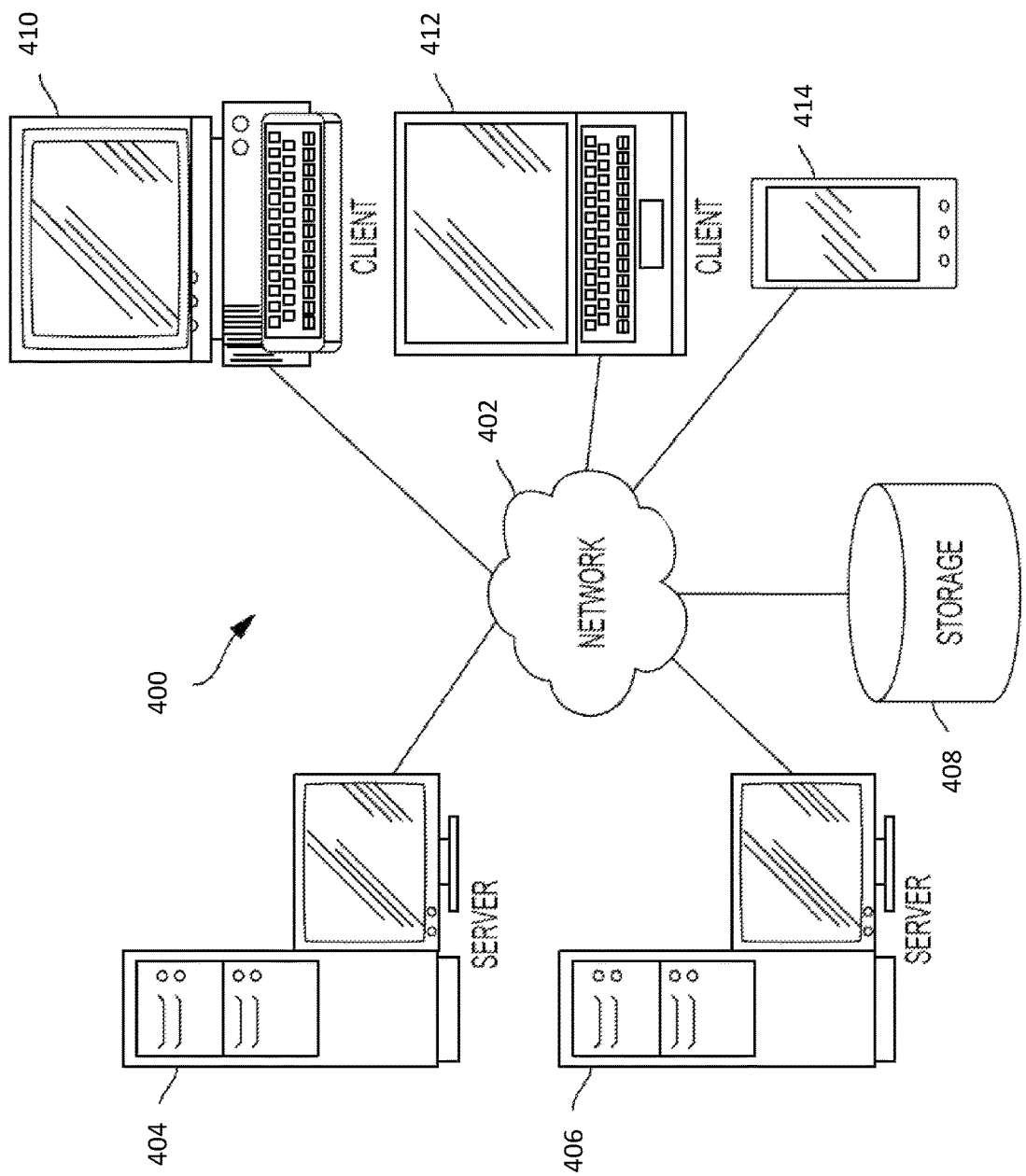
FIG. 8 is a schematic representation of an illustrative computer network suitable for use with aspects of the present disclosure.

As shown in FIG. 8, this example describes a general network data processing system 400, interchangeably termed a computer network, a network system, a distributed data processing system, or a distributed network, aspects of which may be included in one or more illustrative embodiments of the UTCDs described herein. For example, a computer network is an example of a distributed data processing system such as system 400.

It should be appreciated that FIG. 8 is provided as an illustration of one implementation and is not intended to imply any limitation with regard to environments in which different embodiments may be implemented. Many modifications to the depicted environment may be made.

Network system 400 is a network of devices (e.g., computers), each of which may be an example of data processing system 400, and other components. Network data processing system 400 may include network 402, which is a medium configured to provide communications links between various devices and computers connected within network data processing system 400. Network 402 may include connections such as wired or wireless communication links, fiber optic cables, and/or any other suitable medium for transmitting and/or communicating data between network devices, or any combination thereof.

In the depicted example, a first network device 404 and a second network device 406 connect to network 402, as do one or more computer-readable memories or storage devices 408. Network devices 404 and 406 are each examples of data processing system 300, described above. In the depicted example, devices 404 and 406 are shown as server computers, which are in communication with one or more server data store(s) that may be employed to store information local to server computers 404 and 406, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 410 and 412 and/or a client smart device 414, may connect to network 402. Each of these devices is an example of data processing system 300, described above regarding FIG. 7. Client electronic devices 410, 412, and 414 may include, for example, one or more personal computers, network computers, and/or mobile computing devices such as personal digital assistants (PDAs), smart phones, handheld gaming devices, wearable devices, and/or tablet computers, and the like. In the depicted example, server 404 provides information, such as boot files, operating system images, and applications to one or more of client electronic devices 410, 412, and 414. Client electronic devices 410, 412, and 414 may be referred to as "clients" in the context of their relationship to a server such as server computer 404. Client devices may be in communication with one or more client data store(s) 420, which may be employed to store information local to the clients (e.g., cookie(s) and/or associated contextual information). Network data processing system 400 may include more or fewer servers and/or clients (or no servers or clients), as well as other devices not shown.

In some examples, first client electric device 410 may transfer an encoded file to server 404. Server 404 can store the file, decode the file, and/or transmit the file to second client electric device 412. In some examples, first client electric device 410 may transfer an uncompressed file to server 404 and server 404 may compress the file. In some examples, server 404 may encode text, audio, and/or video information, and transmit the information via network 402 to one or more clients.

Client smart device 414 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH©, WiFi, or mobile broadband networks. Wireless connectively may be established among smart devices, smartphones, computers, and/or other devices to form a mobile network where information can be exchanged.

Data and program code located in system 400 may be stored in or on a computer-readable storage medium, such as network-connected storage device 408 and/or a persistent storage 308 of one of the network computers, as described above, and may be downloaded to a data processing system or other device for use. For example, program code may be stored on a computer-readable storage medium on server computer 404 and downloaded to client 410 over network 402, for use on client 410. In some examples, client data store 420 and server data store 422 reside on one or more storage devices 408 and/or 308.

Network data processing system 400 may be implemented as one or more of different types of networks. For example, system 400 may include an intranet, a local area network (LAN), a wide area network (WAN), or a personal area network (PAN). In some examples, network data processing system 400 includes the Internet, with network 402 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 402 may be referred to as a "cloud." In those examples, each server 404 may be referred to as a cloud computing node, and client electronic devices may be referred to as cloud consumers, or the like. FIG. 8 is intended as an example, and not as an architectural limitation for any illustrative embodiments.

E. Illustrative Combinations and Additional Examples

This section describes additional aspects and features of the UTCD, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A method, implemented in a data processing system, the method comprising: receiving, using a data processing system, departure and destination coordinates for each target of a plurality of targets;
    identifying, using the data processing system, obstacles between the departure and destination coordinates;
    calculating, using the data processing system, an initial solution for trajectories of each target of the plurality of targets;
    calculating, using the data processing system, an optimal solution based on the initial solution; and directing or controlling, using the data processing system, each target of the plurality of targets based on the optimal solution for each target of the plurality of targets.

A2. The method of paragraph A1, wherein calculating the optimal solution generates local coordinates, and further comprising converting, using the data processing system, the local coordinates to standard coordinates.

B1. A data processing system for directing or controlling each target of a plurality of targets, the system comprising:
a processor;
a memory; and
a UTCD program including a plurality of instructions stored in the memory and executable by the processor to:
receive departure and destination coordinates for each target of a plurality of targets;
identify obstacles between the departure and destination coordinates;
calculate an initial solution for trajectories of each target of the plurality of targets;
calculate an optimal solution based on the initial solution; and
direct or control each target of the plurality of targets based on the optimal solution for each target of the plurality of targets.

B2. The data processing system of paragraph B1, wherein the UTCD program further includes a plurality of instructions stored in the memory and executable by the processor to convert local coordinates of the optimal solution to standard coordinates.

C1. A computer program product for directing or controlling each target of a plurality of targets, the computer program product comprising:
a non-transitory computer-readable storage medium having computer-readable program code embodied therewith, the computer readable program code comprising:
at least one instruction to receive departure and destination coordinates for each target of a plurality of targets;
at least one instruction to identify the coordinates of obstacles between the departure and destination coordinates using the same coordinate system as the departure and destination coordinates;
at least one instruction to calculate an initial solution for trajectories of each target of the plurality of targets;
at least one instruction to calculate an optimal solution based on the initial solution; and
at least one instruction to direct or control each target of the plurality of targets based on the optimal solution for each target of the plurality of targets.

C2. The computer program product of paragraph C1, wherein the computer readable program code further comprises at least one instruction to convert local coordinates of the optimal solution to standard coordinates.

Advantages, Features, and Benefits

The different embodiments of the universal trajectory calculators and directors described herein provide several advantages over known solutions for calculating and directing multiple targets or objects simultaneously in two- or three-dimensional space without experiencing interference or with minimal interference as possible among the objects and/or with obstacles. For example, illustrative embodiments described herein allow for targets (e.g., packages) to travel on their individual trajectories without the possibility of any such targets intersecting another. Benefits for providing pre-programmed non-intersecting trajectories are safety and public acceptance. Pre-programmed trajectories eliminate the need for imminent collision detection and avoidance hardware and protocols. In a busy space, avoidance maneuvers of multiple targets might create collisions. Consumer awareness of the added safety provided by the UTCD could enhance its acceptance in the transportation sector as the standard protocol.

Additionally, and among other benefits, illustrative embodiments described herein allow for potential transportation cost savings. The UTCD provides the least trajectory length for a target, given the presence of multiple targets each requiring a unique trajectory for an assumed short period. If, however, a user has a specific objective in setting a trajectory, a different objective function can be used for meeting other personal, economic, or societal objectives. For example, if a certain target is to move from the same departure point to the same destination point many times in a year, a trajectory that minimized total length of travel of that target for a year can be selected as a priority. Prioritizing the most active repeated trajectory would allow for minimizing the cost of the use of energy, which has multiple benefits. No known system or device can perform these functions. Thus, the illustrative embodiments described herein are particularly useful for calculating and directing multiple targets or objects simultaneously. However, not all embodiments described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A method, implemented in a data processing system, the method comprising:
receiving, using a data processing system, departure and destination coordinates for each target of a plurality of targets;
identifying, using the data processing system, obstacles between the departure and destination coordinates;
calculating, using the data processing system, an initial trajectory from the departure coordinates to the destination coordinates for each target of the plurality of targets;
calculating, using the data processing system, an optimal trajectory for each target of the plurality of targets that meets one or more constraints and that is based on the initial trajectory, the one or more constraints including avoiding collisions with the remainder of the plurality of targets and with the identified obstacles;

controlling, using the data processing system, each target of the plurality of targets along the optimal trajectory from the departure coordinates to the destinated coordinates for each target of the plurality of targets, wherein, prior to any target of the plurality of targets moving, the optimal trajectory for each target of the plurality of targets is calculated and each target of the plurality of targets is directed or controlled along the optimal trajectory from the departure coordinates to the destinated coordinates; and wherein calculating an initial trajectory includes:
expressing, using the data processing system, a trajectory for each target of the plurality of targets by a polynomial;
expressing, using the data processing system, each of the expressed polynomial as one or more matrices; and
operating, using the data processing system, on the one or more expressed matrices to calculate the initial trajectory for each target of the plurality of targets; and wherein calculating an optimal trajectory includes:
performing a plurality of calculation trials, wherein, in each trial, a potential trajectory is calculated using different potential values for one or more trajectory parameters; and
comparing 2*n combinations of the potential values of the one or more trajectory parameters for each trial of the plurality of trials with an order of a polynomial, wherein n is the order of the polynomial.

2. The method of claim 1, wherein receiving departure and destination coordinates for each target of a plurality of targets includes receiving ground elevation information and GCS coordinates of a volume in which the initial and optimal trajectories will be contained within.

3. The method of claim 1, further comprising, confirming, using the data processing system, that the optimal trajectories of plurality of targets will not collide with each other, wherein the confirming is performed after the optimal trajectory is calculated but before each target of the plurality of targets is directed or controlled.

4. The method of claim 1, wherein calculating the optimal trajectory generates local coordinates, and further comprising converting, using the data processing system, the local coordinates to standard coordinates.

5. The method of claim 1, wherein calculating an optimal trajectory includes calculating, using the data processing system, an optimal trajectory for each target of the plurality of targets that meets all constraints and that is based on the initial trajectory.

6. The method of claim 1, wherein calculating an optimal trajectory includes calculating an optimal order of a polynomial for the optimal trajectories of the plurality of targets.

7. A data processing system for directing or controlling each target of a plurality of targets, the system comprising:
a processor;
a memory; and
a UTCD program including a plurality of instructions stored in the memory and executable by the processor to:
receive departure and destination coordinates for each target of the plurality of targets;
identify obstacles between the departure and destination coordinates;
calculate an initial trajectory from the departure coordinates to the destination coordinates for each target of the plurality of targets;
calculate an optimal trajectory for each target of the plurality of targets that meets one or more constraints and that is based on the initial trajectory, the one or more constraints including avoiding collisions with the remainder of the plurality of targets and with the identified obstacles;
control each target of the plurality of targets along the optimal trajectory from the departure coordinates to the destination coordinates for each target of the plurality of targets, wherein, prior to any target of the plurality of targets moving, the optimal trajectory for each target of the plurality of targets is calculated and each target of the plurality of targets is directed or controlled along the optimal trajectory from the departure coordinates to the destinated coordinates; and wherein calculating an initial trajectory includes:
expressing, using the data Processing system, a trajectory for each target of the plurality of targets by a polynomial;
expressing, using the data processing system, each of the expressed polynomial as one or more matrices; and
operating, using the data processing system, on the one or more expressed matrices to calculate the initial trajectory for each target of the plurality of targets; and wherein calculating an optimal trajectory includes:
performing a plurality of calculation trials, wherein, in each trial, a potential trajectory is calculated using different potential values for one or more trajectory parameters; and
comparing 2*n combinations of the potential values of the one or more trajectory parameters for each trial of the plurality of trials with an order of a polynomial, wherein n is the order of the polynomial.

8. The data processing system of claim 7, wherein the UTCD program further includes a plurality of instructions stored in the memory and executable by the processor to:
express trajectory for each target of the plurality of targets by a polynomial;
express each of the expressed polynomial as one or more matrices; and
operate on the one or more expressed matrices to calculate the initial trajectory for each target of the plurality of targets.

9. The data processing system of claim 7, wherein the UTCD program further includes a plurality of instructions stored in the memory and executable by the processor to receive ground elevation information and GCS coordinates of a volume in which the initial and optimal trajectories will be contained within.

10. The data processing system of claim 7, wherein the UTCD program further includes a plurality of instructions stored in the memory and executable by the processor to confirm that the optimal trajectories of the plurality of targets will not collide with each other, wherein the confirming is performed after the optimal trajectory is calculated but before each target of the plurality of targets is directed or controlled.

11. The data processing system of claim 7, wherein the UTCD program further includes a plurality of instructions stored in the memory and executable by the processor to convert local coordinates of the optimal trajectory to standard coordinates.

12. A non-transitory computer-readable storage medium having computer-readable program code for directing or controlling each target of a plurality of targets, the computer readable program code comprising:
    at least one instruction to receive departure and destination coordinates for each target of a plurality of targets;
    at least one instruction to identify the coordinates of obstacles between the departure and destination coordinates using the same coordinate system as the departure and destination coordinates;
    at least one instruction to calculate an initial trajectory from the departure coordinates to the destination coordinates for each target of the plurality of targets; at least one instruction to calculate an optimal trajectory for each target of the plurality of targets that meets one or more constraints and that is based on the initial trajectory, the one or more constraints including avoiding collisions with the remainder of the plurality of targets and with the identified obstacles;
    at least one instruction to control each target of the plurality of targets along the optimal trajectory from the departure coordinates to the destination coordinates for each target of the plurality of targets, wherein, prior to any target of the plurality of targets moving, the optimal trajectory for each target of the plurality of targets is calculated and each target of the plurality of targets is directed or controlled along the optimal trajectory from the departure coordinates to the destinated coordinates; and
    wherein calculating an initial trajectory includes:
        expressing, using the data processing system, a trajectory for each target of the plurality of targets by a polynomial;
        expressing, using the data processing system, each of the expressed polynomial as one or more matrices; and
        operating, using the data processing system, on the one or more expressed matrices to calculate the initial trajectory for each target of the plurality of targets; and
    wherein calculating an optimal trajectory includes:
        performing a plurality of calculation trials, wherein, in each trial, a potential trajectory is calculated using different potential values for one or more trajectory parameters; and
        comparing 2*n combinations of the potential values of the one or more trajectory parameters for each trial of the plurality of trials with an order of a polynomial, wherein n is the order of the polynomial.

13. The non-transitory computer-readable storage medium of claim 12, wherein the computer readable program code further comprises:
    at least one instructions to express trajectory for each target of the plurality of targets by a polynomial;
    at least one instruction to express each of the expressed polynomial as one or more matrices; and
    at least one instruction to operate on the one or more expressed matrices to calculate the initial trajectory of each target of the plurality of targets.

14. The non-transitory computer-readable storage medium of claim 12, wherein the computer readable program code further comprises at least one instruction to receive ground elevation information and GCS coordinates of a volume in which the initial and optimal trajectories will be contained.

15. The non-transitory computer-readable storage medium of claim 12, wherein the computer readable program code further comprises at least one instruction to confirm that the optimal trajectories of the plurality of targets will not collide with each other, wherein the confirming is performed after the optimal trajectory is calculated but before each target of the plurality of targets is directed or controlled.

16. The non-transitory computer-readable storage medium of claim 12, wherein the computer readable program code further comprises at least one instruction to convert local coordinates of the optimal trajectory to standard coordinates.

* * * * *